M. J. NOVICK.
STREET CAR FENDER.
APPLICATION FILED SEPT. 10, 1914.
1,165,201.
Patented Dec. 21, 1915.
3 SHEETS—SHEET 2.
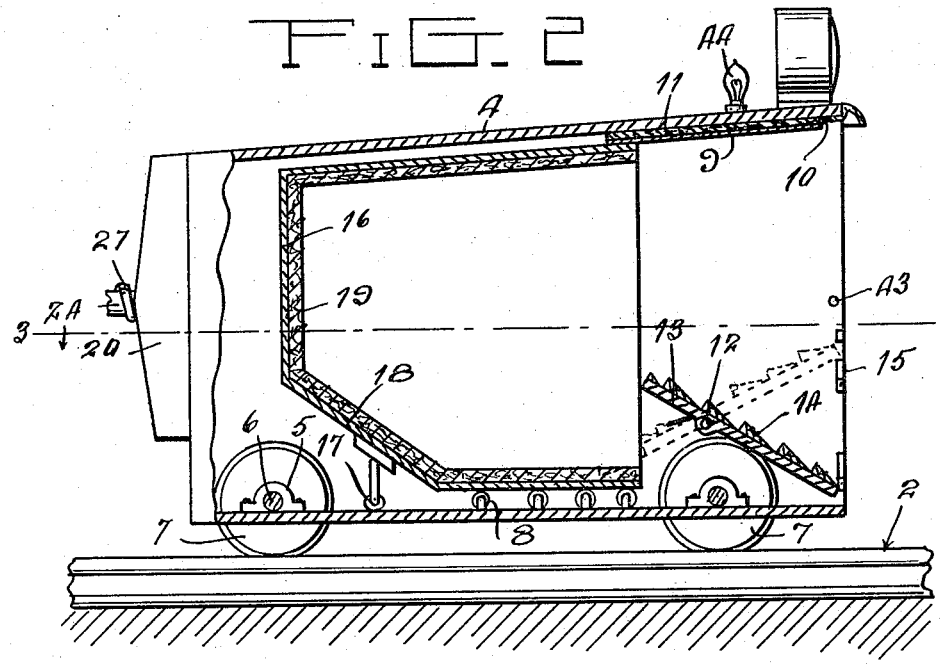
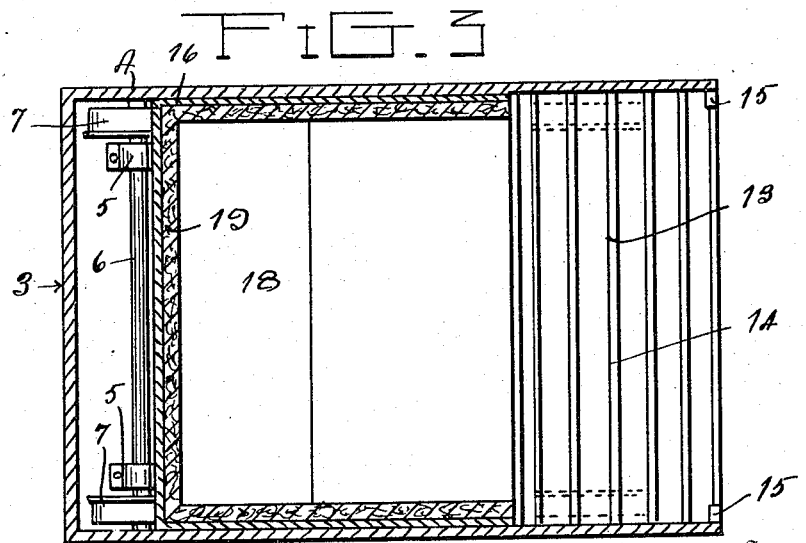

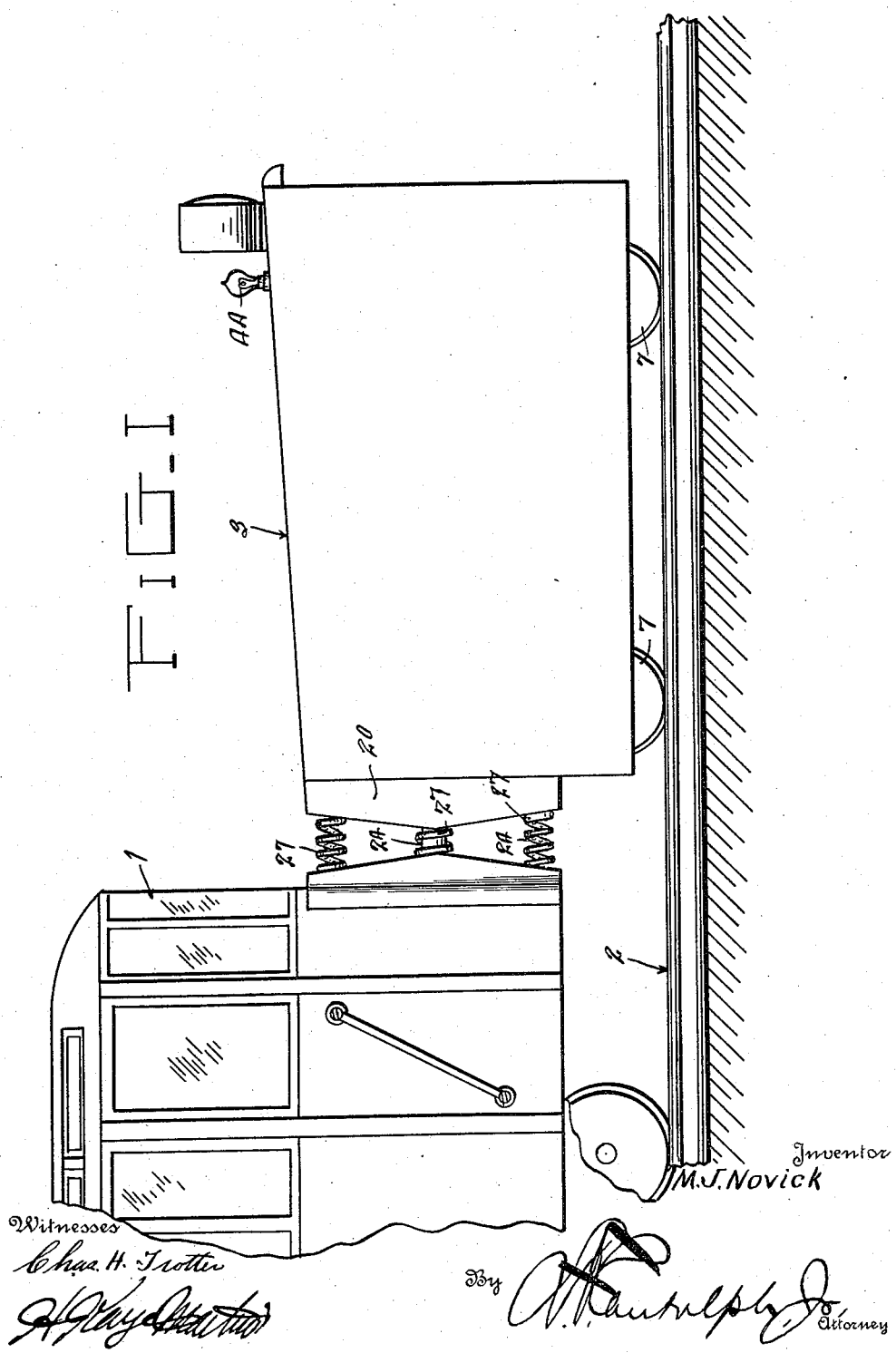

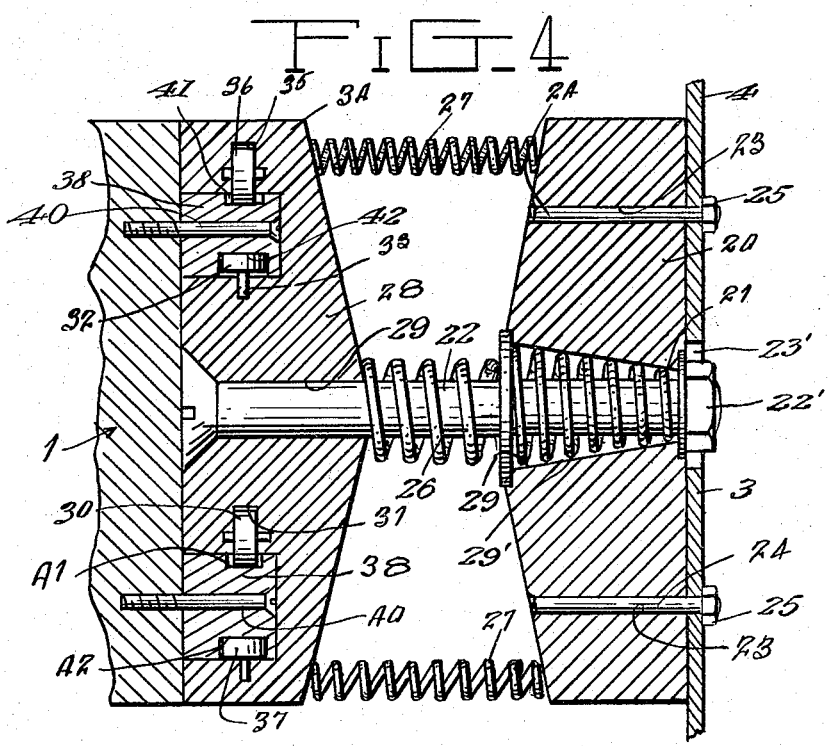

UNITED STATES PATENT OFFICE.

MICHAEL J. NOVICK, OF SCHENECTADY, NEW YORK.

STREET-CAR FENDER.

1,165,201.  Specification of Letters Patent.  Patented Dec. 21, 1915.

Application filed September 10, 1914. Serial No. 861,106.

*To all whom it may concern:*

Be it known that I, MICHAEL J. NOVICK, a citizen of the United States, residing at Schenectady, in the county of Schenectady and State of New York, have invented certain new and useful Improvements in Street-Car Fenders; and I do hereby declare the following to be a full, clear, and exact description of the invention, such as will enable others skilled in the art to which it appertains to make and use the same.

This invention relates to new and useful improvements in street car fenders, and has for its principal object to provide a safety device which will effectively prevent accident and injury to persons with whom the car may collide.

Another object of the invention is to provide a novel construction of fender which will effectively protect pedestrians and others using the highways over which the cars travel against injury.

A further object of the invention is to provide a fender which is capable of being attached to any car of ordinary construction and which will at all times remain on the track regardless of the position of the car.

With these and other objects in view, the invention consists in the novel combination and arrangement of parts which will be fully set forth in the following specification and accompanying drawings, in which—

Figure 1 is a side view in elevation of a fender constructed in accordance with this invention and showing the same as it would appear when attached to a car, Fig. 2 is a longitudinal sectional view of a fender constructed in accordance with this invention, Fig. 3 is a horizontal sectional view taken on line 3—3 of Fig. 2, Fig. 4 is an enlarged detail sectional view of the connecting element by means of which the fender is operatively connected to the car and showing a fragment of the casing, and Fig. 5 is a detail elevational view of one of the connecting members. Fig. 6 is a fragmentary front view in elevation of the fender, showing the doors in their closed positions.

Referring now to the drawings by characters of reference, the numeral 1 designates as an entirety a car of the usual construction which runs on the ordinary track designated generally by the numeral 2. This car is shown connected to the fender which is designated by the numeral 3, and is provided with suitable wheels which also are arranged to run on the track 2 hereinbefore referred to. This fender 3 comprises the outer shell or main casing 4 which is open at its forward end and carries on its under side the bearings 5 in which the axles 6 of the wheels 7 are journaled. These wheels 7 are of the usual flange type and are arranged to support the main casing 4 and hold the car to the rails. Suitably secured within the main casing 4 on its bottom wall are provided the rollers 8, the use of which will appear as the description proceeds.

A suitable front swinging panel 9 is pivotally secured to the side walls of the main casing 4 as at 10 and said front panel carries a suitable padding 11, the use of which will be more fully hereinafter described. A transversely extending bar 12 is carried by the walls of the main casing 4, and said bar forms the pivot point for the rocking plate 13 which is also provided with suitable upholstering or cushioning material 14. This plate 13 is arranged to normally rest in the position illustrated in Fig. 1 and the side walls of the main casing 4 are provided with suitable latches 15 which are arranged slightly above the pivot bar 12 and are so constructed that when the plate 13 is thrown into the position illustrated in the dotted lines in Fig. 2, the same will be held upwardly and against movement.

Slidable within the main casing 4 is the casing 16, the bottom wall of which is arranged to be supported by the rollers 8. A suitable auxiliary supporting roller 17 is secured to the angular portion 18 of the casing to prevent the said casing from becoming disarranged within the main casing 4 and is arranged to take up the shock when a person falls into the fender.

Secured to the main casing 4 at its closed end is a block 20, which block is provided with a central flared opening 21 through which the king bolt 22 extends. Formed laterally of the opening 21 are the apertures 23 for the reception of the bolts 24, which bolts extend therethrough and through suitable openings in the end wall of the casing 4 and are provided with suitable nuts 25 to firmly hold the block 20 on the casing 4. Surrounding the bolt 22 is a suitable compression coil spring 26, which yieldably holds the block 20 spaced from the buffing element 28, which will be more fully hereinafter described. In order to further assist in holding the members 20 and 28 in spaced relation there are provided the lateral coil springs 27, which are of the compression type, as clearly seen upon reference to Fig. 4.

Formed in the dash board 1 are suitable threaded openings for the reception of the bolts 40, which extend through apertures formed at spaced intervals in the guide rails 38 and holds the rails in place. These guide rails are formed with suitable channels or grooves 41 and 42 in their upper and lower faces respectively, which grooves are arranged to receive the rollers carried by the buffing element 28. The buffing element 28 previously referred to is formed with a central opening for the reception of the bolt 22 and this opening alines with the flared opening 21 of the block 20. Suitable grooves or channels are formed in the rear face of the buffing element 28 and in the upper side wall of each of these channels is formed a longitudinal series of recesses 31 and 35 in which the rollers 30 and 36 are mounted. The treads of the rollers 36 engage the bottom wall of the groove 41 in the upper track member, while the rollers 30 in the longitudinal series of recesses 31 engage the bottom walls of the grooves 41 in the lower guide rail. It will thus be seen that the buffing element 28 is supported on rollers which will allow the same to slide freely across the front of the car. Formed in the bottom side wall of each of the grooves in the buffing element 28 are recesses 33 for the reception of the trunnions of the rollers 32 and 37. These rollers are arranged to extend into their respective grooves and engage the walls of said grooves, which grooves are formed in the under faces of the guide rails. It will thus be seen that longitudinal displacement of the buffing element 28 with relation to the car is prevented.

Loosely mounted on the bolt 22 adjacent the wider end of the flared opening 21 is a suitable collar 29, which forms an abutment for the enlarged end of the compression coil springs 29', the smaller end of which abuts a washer secured in place by the nut 22', which is threaded on the end of the bolt 22. The end wall of the casing 4 is formed with a suitable opening 23', which is of a size sufficient to accommodate the nut 22'. Suitable lateral openings are formed in this wall for the reception of the ends of the bolts 24 so that a block 20 can be readily attached to the casing 4, as clearly illustrated in Fig. 4.

Secured to one of the vertical side walls of the casing 4 is a suitable contact point 43 which is arranged to coöperate with the contact point carried by the swinging panel 9, to form a connection through a suitable circuit to light the lamp 44 and indicate to the driver of the car the fact that the fender has been tripped, and the panel 9 swung downwardly, thus closing the opening.

It will thus be seen that a simple and effective fender is provided which will indicate to the operator of the car that he has picked up a person or an object and the car may then be stopped to permit the fender to be opened and the contents removed.

It will be apparent from the foregoing that in use the device is connected to a car of the ordinary construction by means of the connecting members illustrated in detail in Fig. 4, and when a person or object is encountered the inclined plate 13 will rock rearwardly thereby tossing the person or object into the chamber or casing 16. In this way it will be seen that the member 13 will be thrown into the position illustrated in the dotted lines and will be held upwardly by means of the latch member 15. Simultaneously with the rolling rearwardly of the casing 16 within the main casing 4 the panel 9 will swing lownwardly on its hinge 10 and be held by means of the plate 13 against movement until the plate is released and the device reset to its normal operating position. Upon the downward movement of the panel 9 it will be apparent that the contact point carried thereby, which is not shown, and the contact point 43 will complete a circuit through the lamp 44 and thereby signal the operator of the car and warn him of the fact that there is a person or object within the fender.

While in the foregoing there has been shown and described the preferred embodiment of this invention, it is to be understood that such changes may be made in the combination and arrangement of parts as will fall within the spirit and scope of the invention as defined in the appended claims.

What is claimed is:—

1. A fender for railway cars including a main casing, wheels carried by the main casing and arranged to run on the car track, one end of the main casing being open, a swinging panel secured to the upper side of the casing and arranged to partially close the opening, a rocker plate within the main casing arranged to be normally inclined downwardly and outwardly, said rocker plate being so constructed as to close the remaining portion of the opening when the swinging panel is closed, an inner casing slidable within the main casing, said inner casing being padded to relieve the impact when an object falls thereinto, and means to hold the panel and plate in their closed position after the device has been operated.

2. A fender comprising a main casing, wheels mounted on the main casing and arranged to support the same clear of the track, the front end of the main casing being open, a casing within the main casing arranged to slide rearwardly with relation to the main casing to prevent a person or object being injured upon falling into the fender, a swinging panel hingedly secured to the upper side of the main casing, said swinging panel partially closing the open end of the casing when lowered, and a rocker plate pivoted within the main casing, said plate coöperating with the swinging panel to close the opening.

3. A fender comprising a main casing having an open end, a casing slidable within the main casing, means to close the main casing, a block carried by the main casing, a bolt extending through the block, a spring surrounding the bolt, guide rails secured to the dash board of a car, a buffing block carried by the bolt and spaced from the block by said spring, said buffing block being slidably mounted on the guide rails to permit the same to swing laterally, and rollers carried by the buffing block to engage the guide rails.

4. The combination with a car, of a fender, said fender comprising an open ended main casing, a casing within the main casing, a panel and plate to close the main casing, a block carried by the closed end of the main casing, the block being recessed, a bolt extending through the block, a spring surrounding the bolt and seated in the recess in the block, a spring surrounding the bolt and bearing against the block, a buffing element carried by the bolt and spaced from the block by means of the spring, rollers carried by the buffing element, and guide rails carried by the car and arranged to engage rollers to permit lateral movement of the fender with relation to the car.

In testimony whereof I affix my signature in presence of two witnesses.

MICHAEL J. NOVICK.

Witnesses:
WALTHER DOBIES,
ALBERT FARLEY.